(12) United States Patent
Scott et al.

(10) Patent No.: US 9,517,746 B2
(45) Date of Patent: Dec. 13, 2016

(54) BAG-IN-BAG SAFETY RESTRAINT WITH DIRECTIONAL INFLATION

(71) Applicant: FORD GLOBAL TECHNOLOGIES, LLC, Dearborn, MI (US)

(72) Inventors: Timothy Scott, Benfleet (GB); Markus Koelsch, Cologne (DE); Johannes A. Varcus, Sprockhovel (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/531,393

(22) Filed: Nov. 3, 2014

(65) Prior Publication Data

US 2015/0061265 A1 Mar. 5, 2015

Related U.S. Application Data

(62) Division of application No. 14/082,552, filed on Nov. 18, 2013, now Pat. No. 8,905,433.

(30) Foreign Application Priority Data

Nov. 16, 2012 (GB) .................................. 1220682.7
Mar. 22, 2013 (GB) .................................. 1305298.0

(51) Int. Cl.
*B60R 21/26* (2011.01)
*B60R 21/231* (2011.01)
(Continued)

(52) U.S. Cl.
CPC ....... *B60R 21/23138* (2013.01); *B60R 21/207* (2013.01); *B60R 21/2346* (2013.01);
(Continued)

(58) Field of Classification Search
CPC ............ B60R 21/23138; B60R 21/207; B60R 21/237; B60R 21/2346; B60R 21/26; B60R 2021/23146
(Continued)

(56) References Cited

U.S. PATENT DOCUMENTS 5,899,490 A * 5/1999 Wipasuramonton .. B60R 21/237
280/730.2
5,941,559 A 8/1999 Rudolf et al.
(Continued)

FOREIGN PATENT DOCUMENTS

EP 1415868 A2 5/2004
GB 2440672 A 2/2008
(Continued)

*Primary Examiner* — Karen Beck
(74) *Attorney, Agent, or Firm* — Frank MacKenzie; MacMillan, Sobanski & Todd, LLC

(57) ABSTRACT

An air bag system deploys from within a structural element of a vehicle. A main bag is configured for storage in a folded condition in an internal region behind a covering of the structural element, wherein the main bag has a distal end configured to rupture a tear seam in the covering. A shielding bag is disposed over an inflator and has a projection body extending away from the inflator to a remote edge within the main bag. The projection body is substantially continuous in the direction of the main bag except for at least one gas passage at the remote edge for coupling inflation gas from the inflator to the main bag. The main bag has a fold proximate to the gas passage so that inflation of the main bag begins with the unfolding of the fold in a manner that displaces the main bag toward the tear seam.

16 Claims, 10 Drawing Sheets

(51) Int. Cl.
*B60R 21/207* (2006.01)
*B60R 21/2346* (2011.01)
*B60R 21/237* (2006.01)

(52) U.S. Cl.
CPC ............ *B60R 21/26* (2013.01); *B60R 21/237* (2013.01); *B60R 2021/23146* (2013.01)

(58) Field of Classification Search
USPC ........................................................ 280/736
See application file for complete search history.

(56) References Cited

U.S. PATENT DOCUMENTS

| | | | |
|---|---|---|---|
| 5,944,342 A | 8/1999 | White, Jr. et al. | |
| 5,951,038 A | 9/1999 | Taguchi et al. | |
| 5,957,486 A | 9/1999 | Taguchi et al. | |
| 6,095,557 A * | 8/2000 | Takimoto | B60R 21/2338 |
| | | | 280/739 |
| 6,231,070 B1 * | 5/2001 | Sunabashiri | B60R 21/237 |
| | | | 280/730.2 |
| 6,247,727 B1 | 6/2001 | Hamada et al. | |
| 6,270,113 B1 * | 8/2001 | Wipasuramonton | B60R 21/23138 |
| | | | 280/728.1 |
| 6,279,944 B1 * | 8/2001 | Wipasuramonton | B60R 21/23138 |
| | | | 280/729 |
| 6,378,896 B1 * | 4/2002 | Sakakida | B60R 21/21 |
| | | | 280/296 |
| 6,382,664 B1 | 5/2002 | Hirano et al. | |
| 6,398,258 B2 | 6/2002 | Hamada et al. | |
| 6,450,528 B1 * | 9/2002 | Suezawa | B60R 21/207 |
| | | | 280/730.2 |
| 6,783,151 B2 | 8/2004 | Rasch et al. | |
| 6,827,368 B2 * | 12/2004 | Jang | B60R 21/207 |
| | | | 280/729 |
| 7,530,594 B2 * | 5/2009 | Sonoda | B60R 21/16 |
| | | | 280/730.1 |
| 7,618,060 B2 * | 11/2009 | Harvey et al. | 280/740 |
| 7,648,166 B2 * | 1/2010 | Maripudi | 280/740 |
| 7,681,907 B2 * | 3/2010 | Svenbrant | B60R 21/207 |
| | | | 280/728.2 |
| 7,900,957 B2 * | 3/2011 | Honda | B60R 21/23138 |
| | | | 280/729 |
| 8,029,016 B2 * | 10/2011 | Moritani | B60R 21/233 |
| | | | 280/730.1 |
| 8,136,837 B2 * | 3/2012 | Feller | B60R 21/237 |
| | | | 280/743.1 |
| 8,181,989 B2 * | 5/2012 | Okuhara | B60R 21/207 |
| | | | 280/729 |
| 8,714,584 B2 * | 5/2014 | Honda | B60R 21/233 |
| | | | 280/729 |
| 8,905,433 B2 * | 12/2014 | Scott et al. | 280/736 |
| 9,061,652 B2 * | 6/2015 | Acker et al. | |
| 9,120,457 B2 * | 9/2015 | Kino | B60R 21/207 |
| 2001/0007391 A1 * | 7/2001 | Hamada | B60R 21/2171 |
| | | | 280/743.2 |
| 2002/0149185 A1 * | 10/2002 | Lutz | B60R 21/2171 |
| | | | 280/740 |
| 2004/0135352 A1 | 7/2004 | Igawa et al. | |
| 2006/0255572 A1 * | 11/2006 | Svenbrandt | B60R 21/207 |
| | | | 280/730.2 |
| 2008/0143086 A1 | 6/2008 | Higuchi | |
| 2008/0238057 A1 * | 10/2008 | Inoue | B60R 21/0134 |
| | | | 280/735 |
| 2010/0052296 A1 * | 3/2010 | Sasaki | B60R 7/06 |
| | | | 280/730.1 |
| 2010/0133794 A1 | 6/2010 | Tracht et al. | |
| 2010/0213692 A1 | 8/2010 | Nagai et al. | |
| 2010/0253051 A1 * | 10/2010 | Moritani | B60R 21/233 |
| | | | 280/730.1 |
| 2011/0001308 A1 * | 1/2011 | Shibayama | B60R 21/23138 |
| | | | 280/729 |
| 2011/0042927 A1 * | 2/2011 | Azuma et al. | 280/736 |
| 2011/0074141 A1 * | 3/2011 | Wipasuramonton | B60R 21/23138 |
| | | | 280/736 |
| 2012/0025499 A1 * | 2/2012 | Shibayama | B60R 21/233 |
| | | | 280/730.2 |
| 2013/0076013 A1 * | 3/2013 | Shibayama | B60R 21/263 |
| | | | 280/742 |
| 2014/0035264 A1 * | 2/2014 | Fukushima | B60R 21/23138 |
| | | | 280/730.2 |
| 2014/0138939 A1 * | 5/2014 | Scott | B60R 21/207 |
| | | | 280/736 |
| 2014/0151985 A1 * | 6/2014 | Hotta | B60R 21/23138 |
| | | | 280/730.2 |
| 2014/0239618 A1 * | 8/2014 | Katsumata | B60R 21/23138 |
| | | | 280/728.3 |
| 2015/0014970 A1 * | 1/2015 | Fujiwara | B60R 21/2346 |
| | | | 280/730.2 |
| 2015/0151711 A1 * | 6/2015 | Fujiwara | B60R 21/207 |
| | | | 280/728.2 |
| 2015/0183393 A1 * | 7/2015 | Kino et al. | 280/729 |
| 2015/0266443 A1 * | 9/2015 | Kojima | B60R 21/217 |
| | | | 280/728.2 |
| 2015/0266445 A1 * | 9/2015 | Kojima | B60R 21/231 |
| | | | 280/728.2 |
| 2016/0101758 A1 * | 4/2016 | Fujiwara | B60R 21/23138 |
| | | | 280/729 |

FOREIGN PATENT DOCUMENTS

| | | |
|---|---|---|
| GB | 2443614 B | 9/2011 |
| JP | 2004203272 | 7/2004 |
| WO | 2004062970 A1 | 7/2004 |

* cited by examiner

BAG-IN-BAG SAFETY RESTRAINT WITH DIRECTIONAL INFLATION

CROSS REFERENCE TO RELATED APPLICATIONS

This application is a division of U.S. application Ser. No. 14/082,552, filed Nov. 18, 2013, now U.S. Pat. No. 8,905,433, issued Dec. 9, 2014, and claims priority to UK application 1220682.7, filed on Nov. 16, 2012, and UK application 1305298.0 filed on Mar. 22, 2013.

BACKGROUND OF THE INVENTION

The present invention relates in general to inflatable air bag safety restraints, and, more specifically, to a side air bag deployable from within a passenger seat.

Vehicular air bags protect vehicle occupants during a crash event such as a rollover or a collision with a pole or another vehicle. Historically, air bags were initially provided in the steering wheel and on the instrument panel ahead of the front seat passenger for protection during front end collisions. More recently, side impact air bags have been developed which deploy between an occupant and a side of the vehicle (e.g., a door, B-pillar, or a side window). One type of air bag is mounted internally within a passenger seat and is configured to quickly emerge from the seat into the space between the passenger and the side of the vehicle. Such a seat-mounted air bag may use the expansion of the inflating air bag within the seat to rupture or tear a seam in a seat covering to allow the air bag to project into the desired space.

It is very challenging to deploy a side air bag into the gap between the passenger and the inside surface of the vehicle side (e.g., door) quickly enough 1) because of the smaller initial space between the passenger and the side of the vehicle and 2) because there is less crush space at the side of the vehicle so that impingement of the side structure into the gap occurs sooner in a crash event. Bag inflation must be sufficiently energetic to rupture the seam of the seat covering and to get in place rapidly. Therefore, a relatively higher inflation pressure and gas flow rate must be used. Due to the higher forces, however, it becomes more difficult to ensure that bag expansion is properly channeled in the desired directions. For example, the natural tendency of an inflating bag to expand in all directions may be undesirable in the case of a seat-mounted air bag because it is critical for a tear seam in the seat cover to rupture early in the expansion of the air bag so that the air bag is able to expand into the desired area for protecting the passenger (i.e., instead of encroaching into other areas within the seat or undesirably bulging the seat). Prior art seat-mounted side air bags have employed various supplemental structures in order to direct the forces and the direction of air bag expansion toward the tear seam by using a deployment chute, a plastic clam shell housing, force concentrator straps, seat foam reinforcements, and other supplemental structures. It would be desirable to ensure air bag expansion in the necessary direction without the added expense of such additional structures.

SUMMARY OF THE INVENTION

In order to protect the fabric of the main air bag from hot gases and particulates, it is typically shielded from the direct gas outflow from the inflator by a shield disposed around the inflator exit holes. The shield may be comprised of plastic or medal shields, or it may alternatively be comprised of a cylindrical covering band of heavy weight fabric which is resistant to heat and particulates (often referred to as a Calzone). A conventional Calzone is formed as a fabric cylinder or open-ended tube covering the inflator. According to the present invention, the ends of a Calzone are closed off to form a bag in bag structure. A projection body or wing may be added to the Calzone and one or more vents may be formed in the remote end of the projection body to channel the gas flow for entering the main outer air bag at a remote filling point away from the inflator. The vent location and main bag configuration may be chosen to provide fast filling and pressurization of the Calzone shielding bag so that it may provide a stiff, stable structure to control the main bag unfolding. As a result of the inventive structure, the main bag may deploy from the front of a bag pack instead of from the location of the inflator, thereby providing a better focusing of bag energy onto the seat trim opening seam and a faster, more robust opening of the seam. Expansion of the Calzone shielding bag may controllably preload the seat side trim which also achieves more stable bag deployment. Besides reducing costs by eliminating other countermeasures for directing air bag inflation (e.g., a deployment chute or a clamshell), a slimmer air bag pack allows for better packaging within the passenger seat. The invention is compatible with many folding schemes for the main air bag including but not limited to inboard or outboard rolls, single or double rolls, compression folds, plus-one lateral or longitudinal folds, and Z-folds. Rolls may be offset to give a flatter/thinner bag pack or to obtain a beneficial sequence of deployment. Besides heavy fabric, the Calzone shielding bag may be made from molded plastics, stamped metals, or other materials. The Calzone shielding bag may be angled, biased, folded, or tethered in various ways to tailor the deployment of the main air bag toward an opening seam or to improve out of position (OOP) performance. Specific venting locations at the remote end of the Calzone shielding bag may be provided and may be configured to send more gas flow to certain vertical regions of the main air bag to provide faster deployment or a locally higher bag pressure to certain areas such as the passenger's pelvic region. Tethers may be employed in the Calzone shielding bag to help control its shape when pressurized.

The present invention may provide a method for improving gas flow for the next generation of "slim" flat pack side air bags to increase deployment stability and protect the more tightly packed "bagfolds" that will be used. It may provide an ability to tailor an initial deployment vector and to give a trim "preload" by balancing lateral and longitudinal components of an "L fold" or by placing the Calzone in an angled, biased, or folded condition in the main bag pack in a manner that helps deploy the bag outboard toward a seat trim opening seam and/or improves OOP performance.

The calzone of this invention may allow an air bag to be packed at either side, allowing for a "double deployment front" which improves speed. In the case where there may be expansion restrictions (e.g., due to a closing gap or OOP considerations), the present disclosure may allow a balancing or exchange of bag pressure between two unfolding bag sections which may 1) improve ability for one bag section to get into a reducing space and then pull the second bag section into the gap, and/or 2) reduce the load on an OOP occupant by providing a second bag unfolding path.

In one primary aspect of the invention, an air bag system deploys from within a structural element of a vehicle. An inflator may provide inflation gas in response to an activation signal. A main bag may be configured for storage in a folded condition in an internal region behind a covering of the structural element, wherein the main bag may have a distal end configured to rupture a tear seam in the covering. A shielding bag may be disposed over the inflator and may have a projection body extending away from the inflator to a remote edge within the main bag. The projection body may be substantially continuous in the direction of the main bag except for at least one gas passage at the remote edge for coupling inflation gas from the inflator to the main bag. The main bag may have a fold proximate to the gas passage so that inflation of the main bag begins with the unfolding of the fold in a manner that displaces the main bag toward the tear seam.

The shielding bag may include a reverse fold and a flap disposed on the projection body, such that inflation of the flap extends the shielding bag in a direction toward the tear seam. The flap may be disposed over and close the gas passage prior to inflation. The shielding bag may further comprise an internal tether in the projection body for limiting an expansion width of the shielding bag.

According to another aspect of the present invention, there is provided an air bag system for deploying from within a structural element of a vehicle comprising: an inflator providing inflation gas in response to an activation signal; a main bag in a folded condition configured for storage in an internal region behind a covering of the structural element, wherein the main bag has a distal end configured to rupture a tear seam in the covering; and a shielding bag disposed over the inflator and having a projection body extending away from the inflator, wherein the shielding bag includes a reverse fold and a flap disposed on the projection body, wherein the projection body includes at least one gas passage covered by the flap for coupling inflation gas from the inflator to the main bag, wherein the main bag has a fold proximate to the gas passage so that inflation of the main bag begins with the unfolding of the fold in a manner that displaces the main bag toward the tear seam.

The reverse fold may create an upper flap and a lower flap on opposite sides of the projection body. The shielding bag may further comprise an internal tether in the projection body for limiting an expansion width of the shielding bag.

DETAILED DESCRIPTION OF PREFERRED EMBODIMENTS

Figure 1:
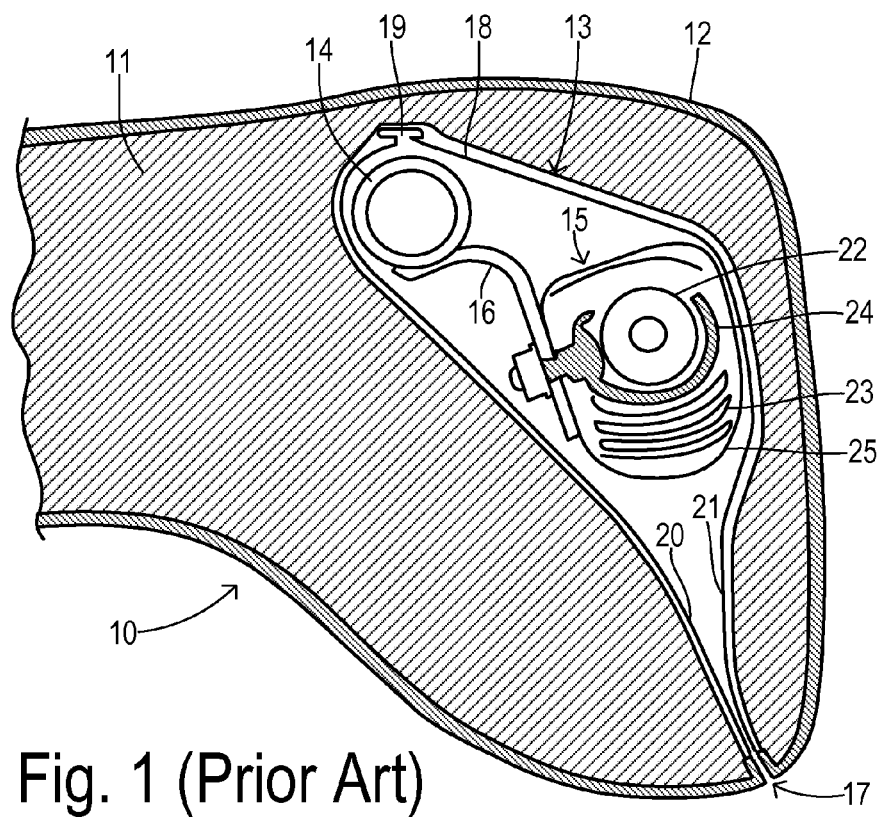
FIG. 1 is a horizontal cross section of a seat-mounted side air bag of the prior art.

FIG. 1 is a horizontal cross-section of a portion of a passenger seat employing a conventional side air bag. A seat 10 has internal foam body 11 with an outer trim covering 12. An inner cavity 13 formed in foam 11 includes a seat frame element 14 supporting an air bag device (or air bag module) 15 via a bracket 16. A vertical tear seam 17 is preferably sewn together through covering 12 and an air bag deployment chute 18 that provides reinforcement around air bag module 15 and helps direct energy from the air bag inflation toward tear seam 17. Deployment chute 18 may preferably be made of nylon and has a closure 19 at one end and has open flaps 20 and 21 that are sewn together within tear seam 17. Air bag module 15 includes an inflator 22 for inflating a main bag 23. A shield 24 protects main bag 23 from hot gases that flow during inflation to cause main bag 23 to expand through an outer cover 25 of air bag module 15.

Figure 2:
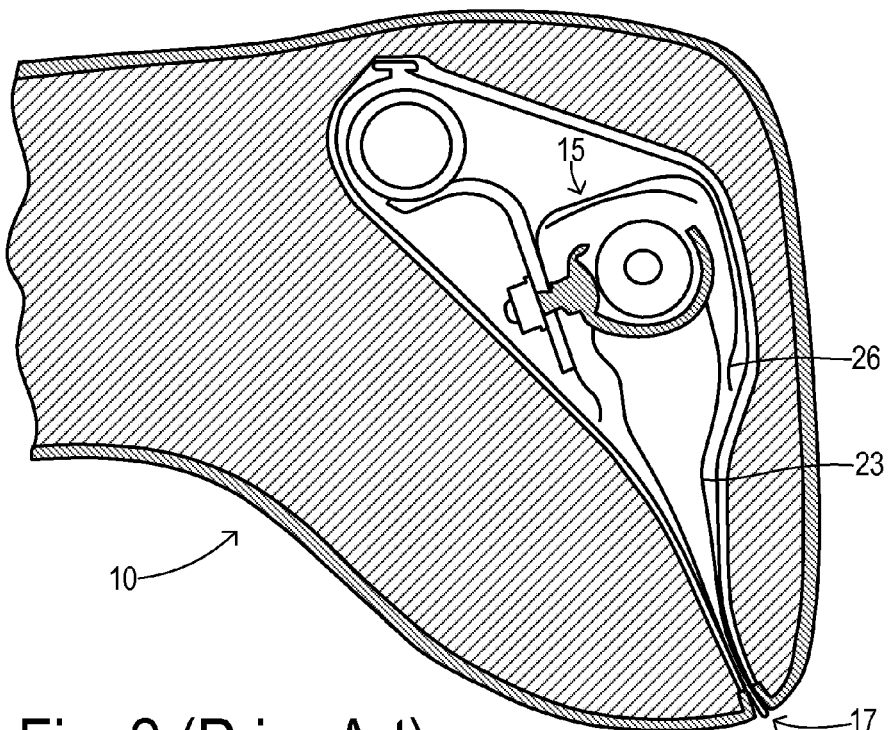
FIGS. 2 and 3 are cross sections showing the air bag of FIG. 1 during the initial and interim stages of deployment, respectively.
Figure 3:
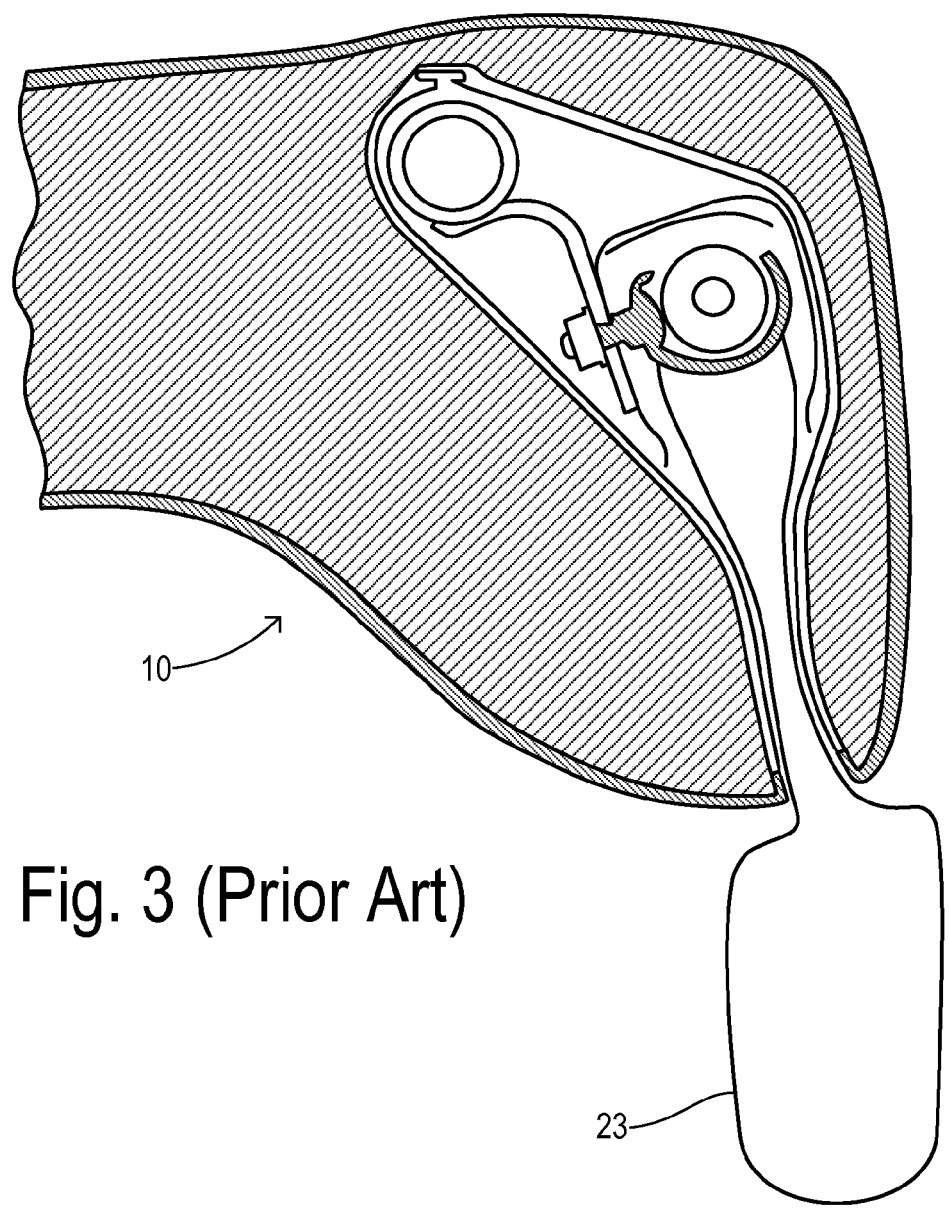

FIG. 2 shows the initial stages of inflation of air bag 23 wherein a door 26 opens within air bag module 15, and air bag 23 advances into seam 17 to rupture the sewn together elements as air bag 23 proceeds outward. FIG. 3 shows the final stages of inflation wherein air bag 23 assumes a desired position between a passenger and a vehicle door (not shown). In this prior art, dedicated structure in the form of the deployment chute and/or reinforcement of the air bag module are required for ensuring sufficiently rigid reaction surfaces which prevent backwards movement of the deploying air bag. Consequently, deployment energy is directed toward the seat trim tear seam and beyond into the space where the air bag is being deployed.

Figure 4:
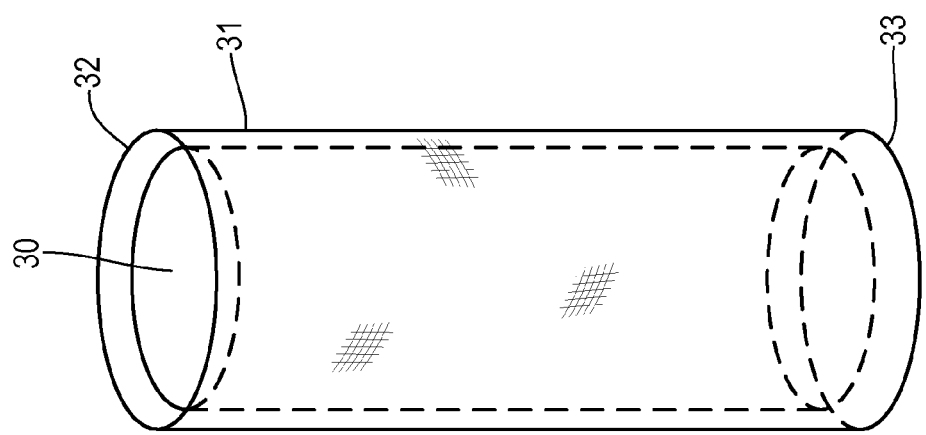
FIG. 4 is a perspective view of an inflator inside a fabric shield of the prior art.

FIG. 4 is a perspective view showing an inflator 30 covered by a prior art shielding bag or Calzone 31 having open ends 32 and 33. In the bag-in-bag system of this invention, shielding bag 31 protects an external main bag (not shown) from hot gases and particulates exiting the radial surface of inflator 30. Axial openings 32 and 33 couple the inflation gases into the main bag. In a seat-mounted side air bag application, it may be desirable to provide inflation gas from the longitudinal ends of shielding bag 31 so that pelvic and thoracic regions of the main bag may be inflated first.

Figure 5:
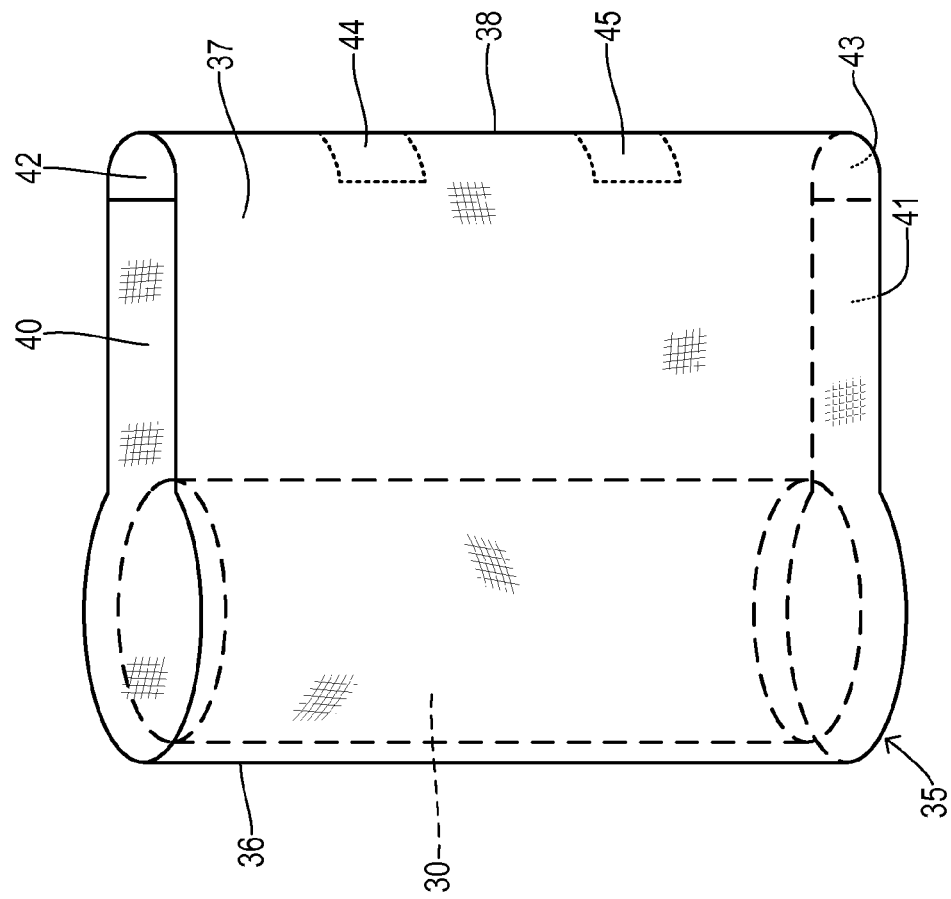
FIG. 5 is a perspective view of an inflator inside a shielding bag of the present invention.

FIG. 5 shows a modified shielding bag 30 for retaining inflator 30 in the manner of the present invention. Shielding bag 35 has a mainly cylindrical end 36 for receiving inflator 30 and a projection body 37 extending away from portion 36 to a remote edge 38 so that projection body 37 forms a wing disposed inside a main bag (not shown). Shielding bag 36 has a closed upper edge 40 and a closed lower edge 41 to contain the inflation gas from inflator 30 so that it cannot enter the main bag by flowing coaxially along inflator 30. Instead, one or more gas passages 42 and/or 43 are provided at remote edge 38 for coupling inflation gas from inflator 30 into the main air bag. Projection body 37 is substantially continuous (i.e., sealed) as it enters the main bag so that inflation of the main bag occurs at a point that is remote from inflator 30. More specifically, inflation occurs in a manner that essentially pulls the folded bag away from inflator 30 and toward the tear seam instead of merely pushing it as in the prior art. Gas passages or vents 42 and 43 are shown at the upper and lower intersections of remote edge 30 with upper and lower edges 40 and 41 in order to skew the expansion of the main bag toward thoracic and/or pelvic regions when desired. Additional gas passages may be added along remote edge 38 if desired, as shown at 44 and 45.

Figure 6:
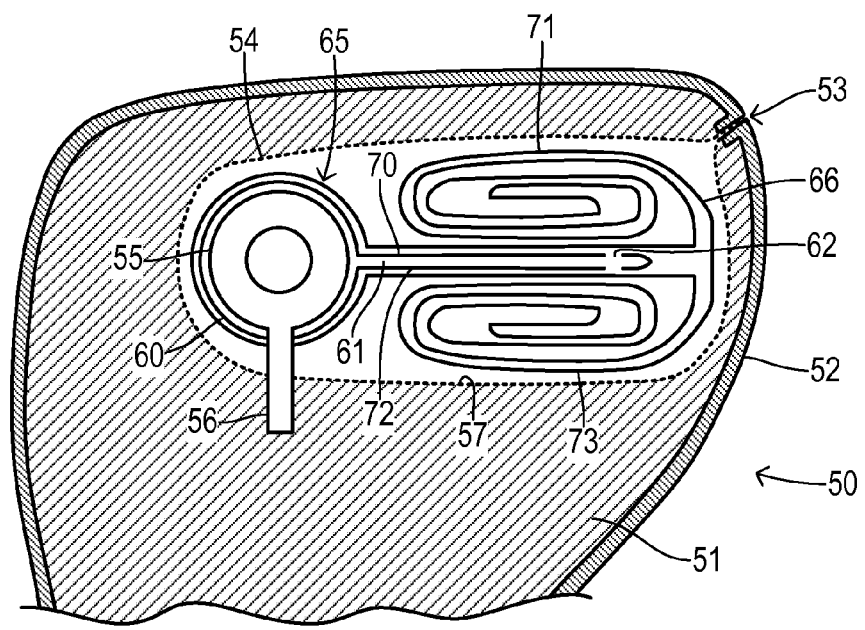
FIG. 6 is a horizontal cross section of a seat-mounted side air bag according to a first embodiment of the invention having a shielding bag with a single projection body.

FIG. 6 is a horizontal cross-section through a portion of a seat 50 containing an air bag system of the present invention. Seat 50 includes an internal seat foam body 51 covered by a covering layer 52 defining a tear seam 53. Foam body 51 includes a cavity 54 into which a side air bag device is installed which includes an inflator 55 with an inflator mounting boss 56 for attaching to a bracket or frame (not shown). The side air bag system may be contained within a soft pack wrapper or tape 57 for packaging purposes using a conventional material such as Tyvek. A soft pack wrapper or tape may be a low cost item as compared with the reinforced chute or other structures of the prior art. A shielding bag 60 is mounted over inflator 55 and has a projection body 61 with a gas passage 62 at the remote edge. A main bag 65 is mounted over and contains shielding bag 60. Main bag 65 may be continuous over inflator 55 and shielding bag 60, as shown, or alternately may be joined with shielding bag 60 in a manner configured to only fully contain projection body 61. Main bag 65 is in an uninflated, folded condition configured for storage in cavity 54 such that a distal end 66 of main bag 65 will rupture tear seam 53 during inflation.

Figure 7:
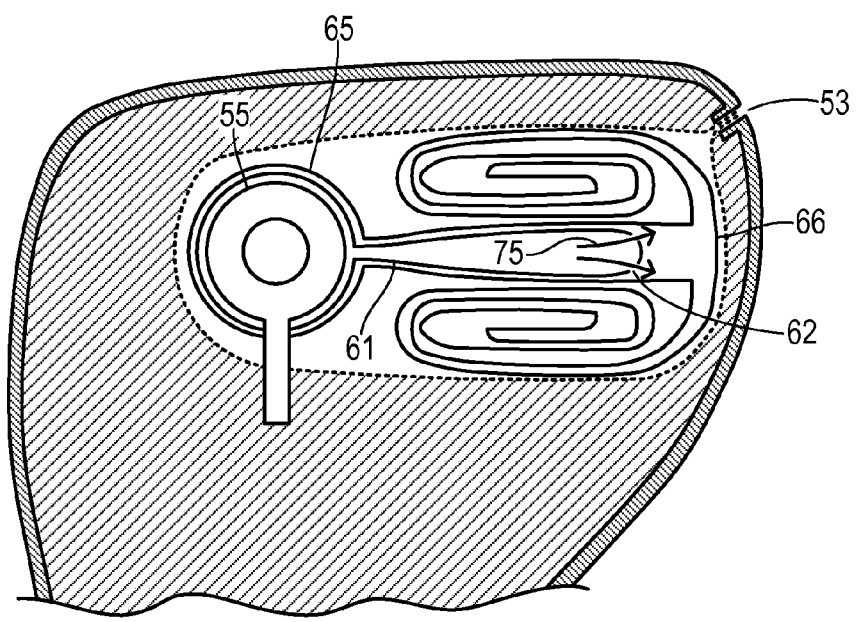
FIGS. 7-9 are cross sections showing the air bag of FIG. 6 in successive stages of deployment.
Figure 8:
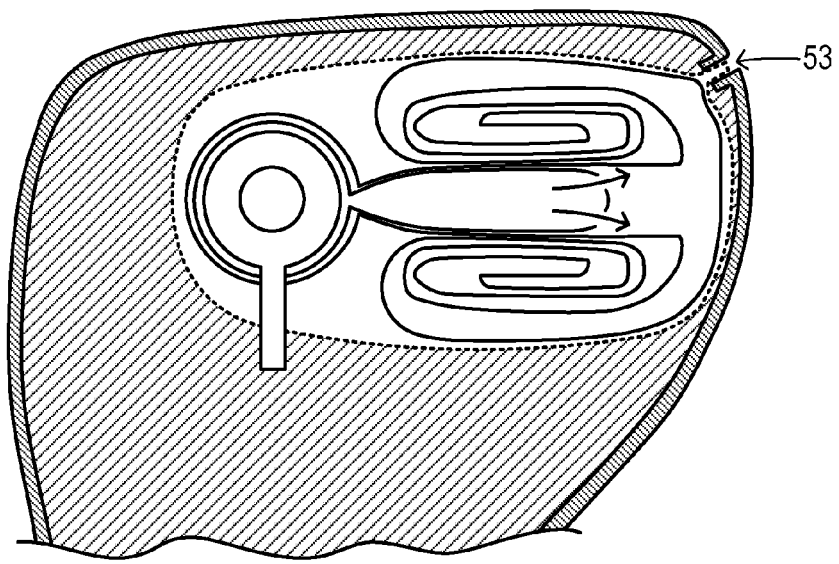
Figure 9:
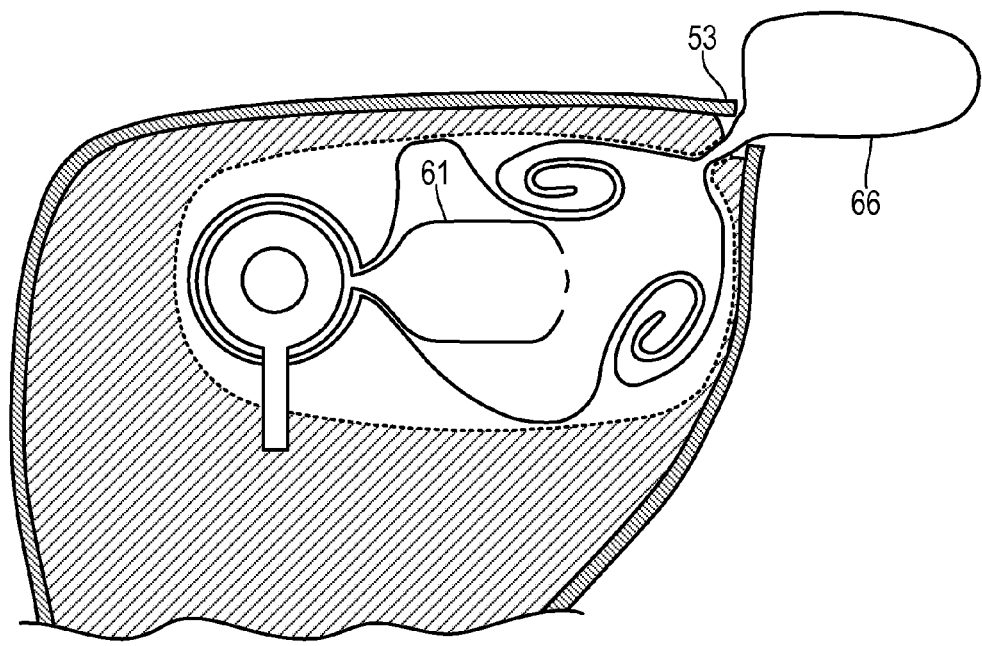

Main bag is configured to have a fold proximate to gas passage 62 of shielding bag 60 so that inflation of main bag 65 begins with the unfolding of the fold in a manner that displaces main bag 65 toward tear seam 53 as described in greater detail below. The inflator responds to an activation signal from a restraint controller (not shown) which depends upon an accelerometer or other crash sensor (not shown). As shown in FIG. 6, projection body 61 has an upper planar surface 70. Main bag 65 has a first rolled section 71 disposed laterally against planar surface 70. Projection body 61 has a lower planar surface 72, and main bag 65 has a second rolled section 73 disposed laterally against planar surface 72. Rolled sections 71 and 73 in this embodiment are shown as inboard and outboard rolls which, when inflated at the location of gas passage 62 as shown in FIG. 7, begin to unroll in a direction away from inflator 55 and toward seam 53. Thus, an inflation gas 75 begins to fill projection body 61 and exits gas passage 62 to enter rolled sections 71 and 73 such that inflation gas 75 pushing against distal end 66 of main bag 65 displaces distal end 66 in a direction coincident with the desired force vector for rupturing seam 53. Main bag 65 progressively unrolls as shown in FIGS. 8 and 9 until distal end 66 ruptures seam 53 and quickly moves into the desired region to protect the occupant in a crash event. The roll directions could also be reversed from what is shown (and may be more desirable in some situations).

Figure 10:
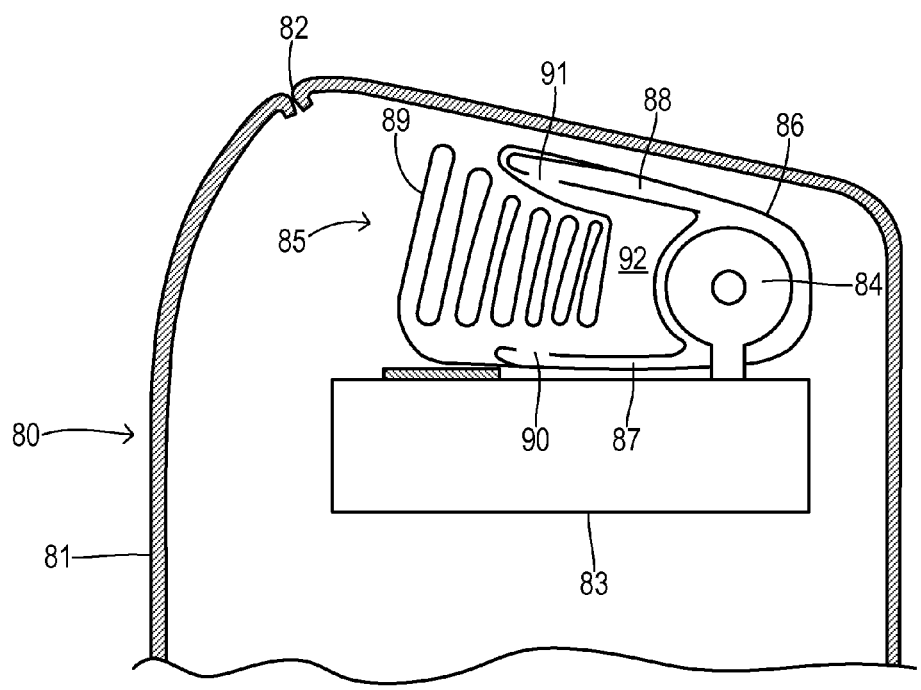
FIG. 10 is a horizontal cross section of an undeployed seat-mounted side air bag according to a second embodiment of the invention having a shielding bag with dual projection bodies.
Figure 11:
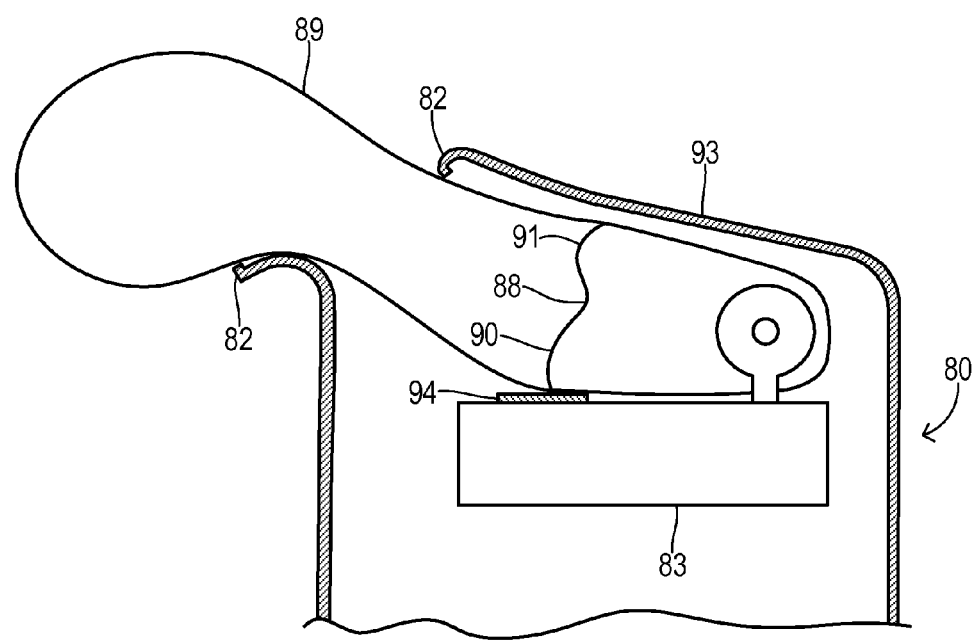
FIG. 11 is a horizontal cross section of the air bag of FIG. 10 in a deployed state.

The embodiment of FIGS. 6-9 shows a shielding bag with a single projection body contained within a main bag having two differently folded sections. A second embodiment in FIG. 10 has a shielding bag with multiple projection bodies and a main bag with a single folded section. More particularly, a seat 80 has a covering layer 81 with a tear seam 82 over a seat foam body (not shown) and containing a frame structure 83 to which an inflator 84 of an air bag module 85 is attached. A shielding bag 86 is mounted over inflator 84 and has projection bodies 87 and 88 contained within a main bag 89. Projection bodies 87 and 88 have respective gas passages 90 and 91 for coupling inflation gas to an internal chamber 92 of main bag 89. Main bag 89 is folded by a Z-fold proximate to gas passages 90 and 91 so that as each Z-fold unfolds, main bag 89 is displaced in the direction of tear seam 82 until it ruptures seam 82 as shown in FIG. 11. Shielding bag 88 may also go through a significant expansion as shown in FIG. 11. The expansion may be limited by tethers (not shown) to achieve favorable inflation performance of main bag 89 while obtaining a desired tensioning or loading of a side 93 of seat 80 by projection body 88 that may assist in rupturing seam 82. Moreover, a portion of main bag 89 may be attached with a portion of seat frame 83 by a hook and loop fastener or a tape body 94 to further constrain the desired projectory of the expansion of main bag 89.

Figure 12:
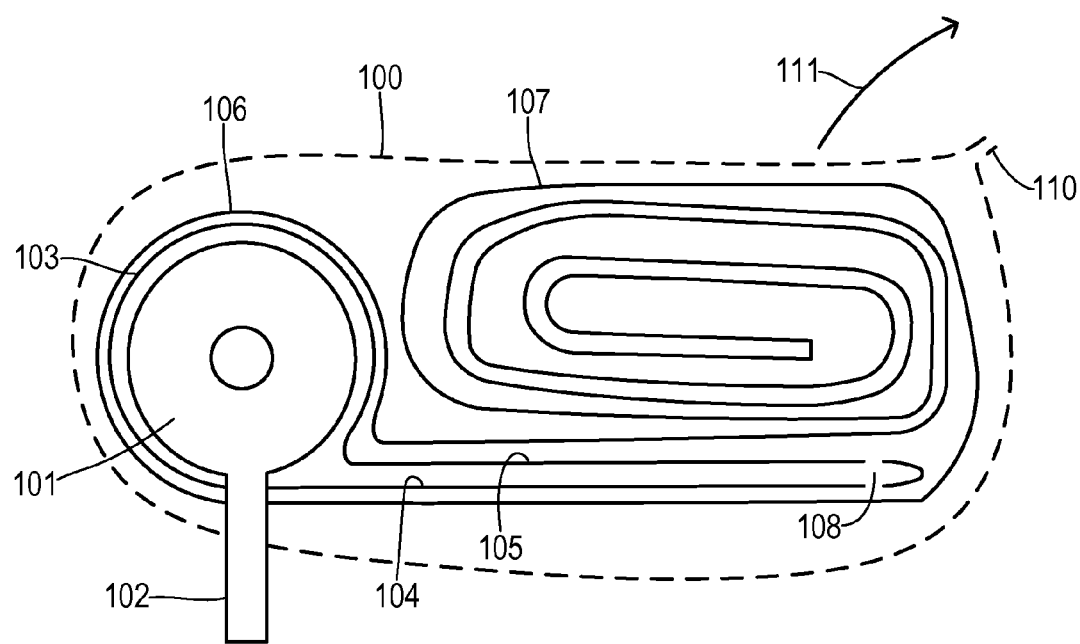
FIG. 12 is a horizontal cross section of a seat-mounted side air bag according to a third embodiment having a shielding bag with an L-fold.

FIG. 12 shows yet another embodiment of a side air bag module of the present invention which may be contained in a soft pack wrapper 100. An inflator 101 has mounting boss 102 for attaching to a seat frame (not shown). A Calzone shielding bag 103 is disposed over inflator 101 and has a projection body 104 configured as a plus L-fold. In the plus L-fold, projection body 104 extends tangently with respect to inflator 101 such that one planar surface 105 of projection body 104 will tend to move laterally during inflation to impart an additional force (in the direction of a tear seam) on the folded section of a main bag 106. More particularly, main bag 106 may have an outboard rolled section 107 that receives inflation gas via a gas passage 108 in projection body 104. An inboard rolling direction could also be used. The upward movement of planar surface 105 of the L-fold combines with unrolling action of rolled section 107 as a result of injecting inflation gas at the location of gas passage 108, whereby main bag 106 is displaced toward a seam 110 of soft pack 100 to follow a trajectory shown by arrow 111. Thus, the present invention may obtain rapid deployment of a main air bag in a desired direction through a tear seam in a passenger seat without requiring the use of reinforcement structures or clamshells within the seat.

FIGS. 13-16 illustrate another embodiment of the invention wherein deployment direction and speed toward the gap can be further increased. In the embodiment shown in FIGS. 6-9, the length of calzone shielding bag 60 is limited to the length of the bag pack itself. By introducing one or more reverse folds in the shielding bag and optionally adding a tether to limit the expansion width of the shielding bag, its effective length during deployment can be extended toward the tear seam, which results in more control and guidance for deployment of the main bag.

Figure 13:
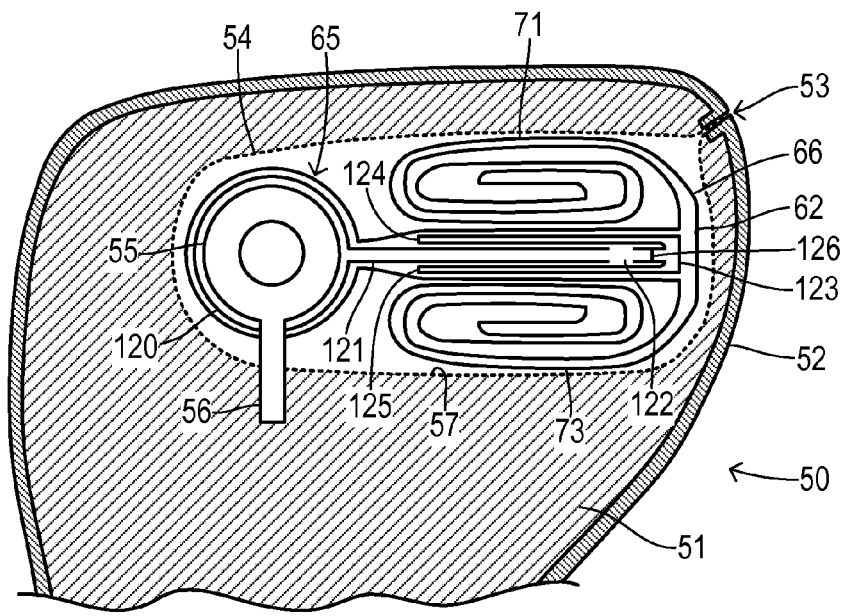
FIG. 13 is a horizontal cross section of a seat-mounted side air bag according to a fourth embodiment of the invention having a shielding bag with reversing folds and an intermediate tether.

FIG. 13 shows this alternative embodiment in a pre-inflation condition. A shielding bag 120 is mounted over inflator 55 and has a projection body 121 with a gas passage 122 at an intermediate location just behind a reverse fold 123 that creates a pair of upper and lower flaps 124 and 125. Although upper and lower flaps are shown, a single flap (e.g., just an upper or lower flap) could alternatively be employed. Main bag 65 is mounted over and contains shielding bag 120. Main bag 65 has a first rolled section 71 disposed laterally against flap 124 and a second rolled section 73 disposed laterally against flap 125. As in the prior embodiment, rolled sections 71 and 73 can each be either an inboard or outboard roll, and, when inflated at the location of gas passage 122, begin to unroll in a direction away from inflator 55 and toward seam 53. In the present embodiment, however, gas passage 122 preferably does not vent any gas to main bag 65 until calzone shielding bag 120 is fully or nearly fully inflated. The folding of flaps 124/125 over gas passage 122 will tend to keep the vent closed until bag 120 is expanded. Any conventional active vent structures can also be incorporated in gas passage 122 such as tear stitch vents or silicon vents. Because of the action of flaps 124 and 125, a stiffening and lengthening of the structure toward seam 53 precedes the unrolling of main bag 65. It is even possible to at least partially rupture seam 53 as a result of inflating shielding bag 120 before it begins to vent significant amounts of gas into main bag 65.

Figure 14:
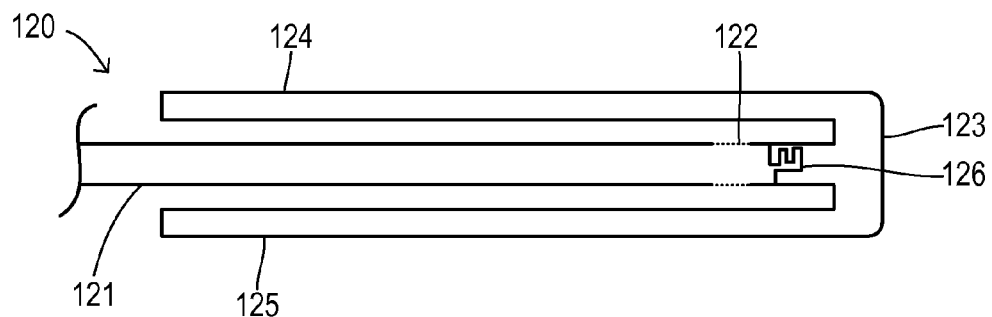
FIG. 14 is a cross section showing the shielding bag in greater detail.

As more clearly shown in FIG. 14, calzone shielding bag 120 may preferably include an internal tether 126 between opposite sides of bag 120 at a location between gas passage 122 and fold 123. By limiting the expansion width of shielding bag 120, tether 126 gives it a more elongated shape (with less overall volume) and provides better directionality of the expansion toward seam 53. As discussed below, additional vents ahead of tether 126 can also be employed.

Figure 15:
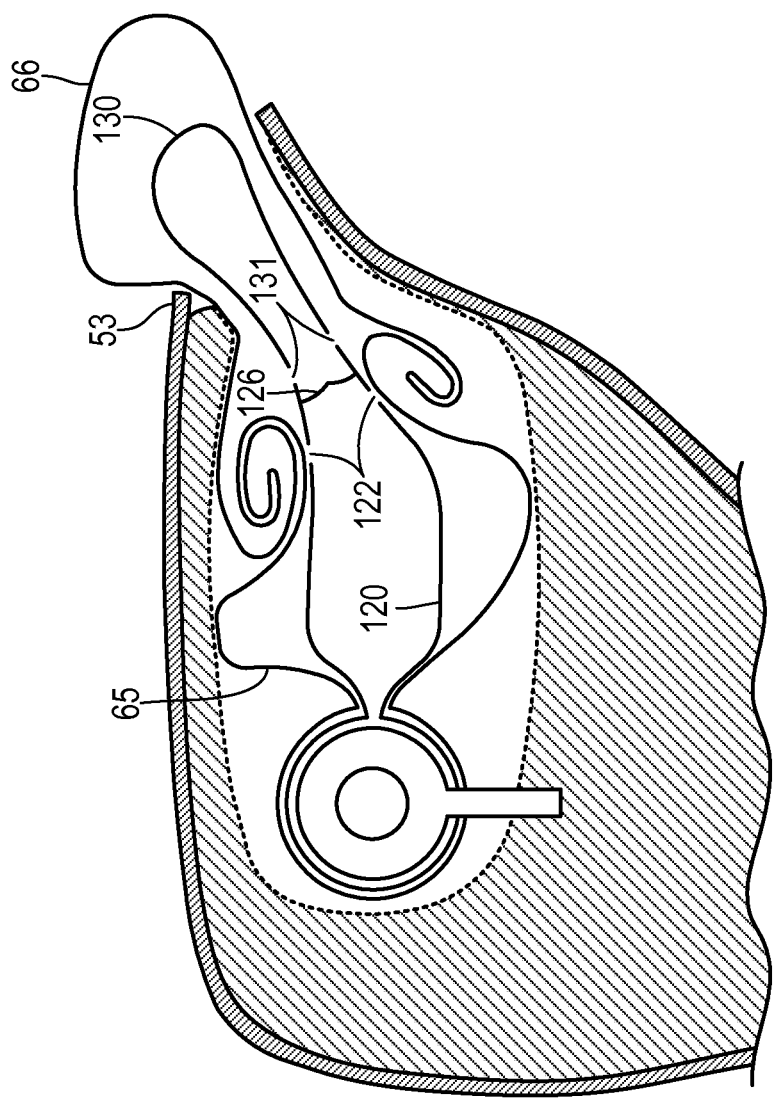
FIGS. 15 and 16 are cross sections showing the air bag of FIG. 13 in successive stages of deployment.

During an initial stage of deployment as shown in FIG. 15, inflation of shielding bag 120 unfolds the flaps so that a distal end 130 extends toward, and sometimes through, seam 53. The unfolding exposes gas passage 122, and any active vent structures therein are opened, to allow inflation gas to enter main bag 65 so that its distal end 66 protrudes through seam 53 and into the gap between the seat and the door of the vehicle. In FIG. 15, tether 126 is not yet fully extended. Supplemental vents 131 are provided between tether 126 and distal end 130 in order to increase venting capacity into main bag 65. Another vent or vents may also be formed at or near distal end 130 to bias the filling of main bag 65 toward the gap. The total vent area is tuned to achieve a balance between being large enough to provide fast filling of the main bag and being small enough to provide the local pressure increases necessary to act as a stiffening member.

Figure 16:
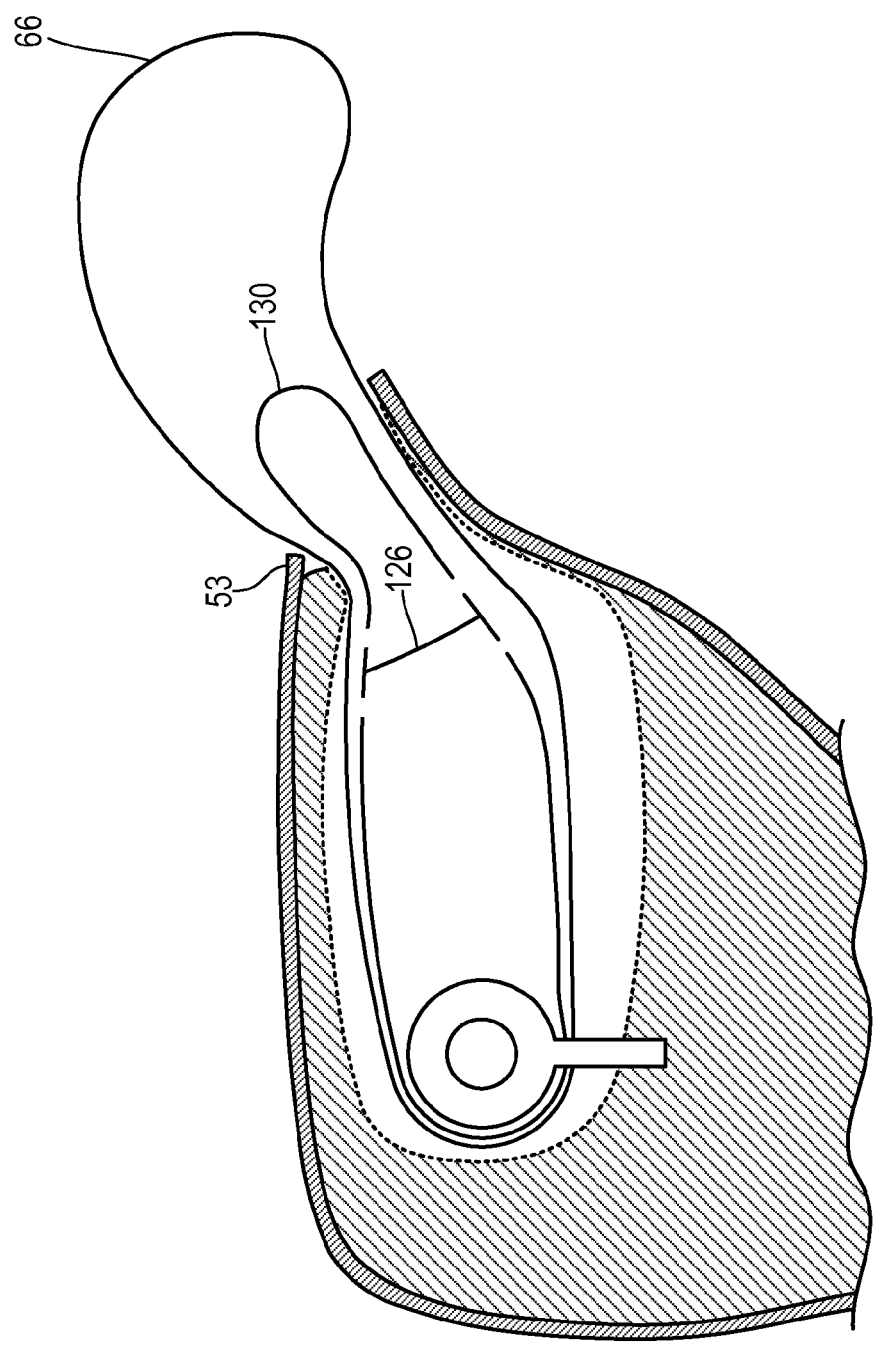

In a later stage of deployment shown in FIG. 16, shielding bag 120 is fully extended and has a shape controlled by tether 126 which has become taut. Main bag 65 fully unrolls and a fast and focused deployment into the desired gap has been obtained.

What is claimed is:

1. A passenger vehicle comprising:
a passenger seat comprising a frame, seat foam, and a covering, wherein the passenger seat has an internal cavity receiving an air bag system for deploying through a tear seam in the covering, wherein the air bag system comprises:
an inflator providing inflation gas in response to an activation signal triggered by a crash event;
a main bag in a folded condition and having a distal end configured to rupture the tear seam in the covering; and
a shielding bag disposed over the inflator and having a projection body extending away from the inflator to a remote edge within the main bag, wherein the projection body is substantially continuous in a direction of the main bag except for at least one gas passage at the remote edge for coupling inflation gas from the inflator to the main bag, wherein when uninflated the projection body extends tangentially with respect to the inflator, wherein the main bag has a folded portion disposed laterally against a first substantially planar surface of the projection body closest to the inflator, wherein the folded portion has a fold proximate to the gas passage at the remote edge so that inflation of the main bag begins with the unfolding of the fold in a manner that displaces the main bag toward the tear seam, wherein the planar surface of the projection body disposed against the folded portion moves laterally during inflation to impart an additional force on the folded portion toward the tear seam, and wherein only the main bag passes through the tear seam upon inflation.

2. The vehicle of claim 1 wherein the projection body has a generally flat, planar shape prior to inflation with the inflation gas.

3. The vehicle of claim 1 wherein the projection body has upper and lower edges, and wherein the gas passage is disposed substantially at an intersection of the remote edge with one of the upper or lower edges.

4. The vehicle of claim 3 wherein the remote edge includes a plurality of gas passages, and wherein a respective gas passage is disposed substantially at an intersection of the remote edge with each of the upper and lower edges.

5. The vehicle of claim 1 wherein the folded portion comprises an outboard roll.

6. The vehicle of claim 1 wherein the shielding bag has first and second projection bodies extending tangentially with respect to opposite sides of the inflator, and wherein each projection body includes at least one respective gas passage at a remote edge thereof.

7. The vehicle of claim 6 wherein the main bag has a folded portion disposed between the first and second projection bodies.

8. The vehicle of claim 7 wherein the folded portion comprises a Z-fold.

9. An air bag system for deploying from within a structural element of a vehicle comprising:
an inflator providing inflation gas in response to an activation signal;
a main bag in a folded condition configured for storage in an internal region behind a covering of the structural element, wherein the main bag has a distal end configured to rupture a tear seam in the covering; and
a shielding bag disposed over the inflator and having a projection body extending away from the inflator to a remote edge within the main bag, wherein the projection body is substantially continuous in a direction of the main bag except for at least one gas passage at the remote edge for coupling inflation gas from the inflator to the main bag, wherein when uninflated the projection body extends tangentially with respect to the inflator, wherein the main bag has a folded portion disposed laterally against a first substantially planar surface of the projection body closest to the inflator, wherein the main bag folded portion has a fold proximate to the gas passage at the remote edge so that inflation of the main bag begins with the unfolding of the fold in a manner that displaces the main bag toward the tear seam, wherein the planar surface of the projection body disposed against the folded portion moves laterally during inflation to impart an additional force on the folded portion toward the tear seam, and wherein only the main bag passes through the tear seam upon inflation.

10. The system of claim 9 wherein the projection body has a generally flat, planar shape prior to inflation with the inflation gas.

11. The system of claim 9 wherein the projection body has upper and lower edges, and wherein the gas passage is disposed substantially at an intersection of the remote edge with one of the upper or lower edges.

12. The system of claim 9 wherein the remote edge includes a plurality of gas passages, and wherein a respective gas passage is disposed substantially at an intersection of the remote edge with each of the upper and lower edges.

13. The system of claim 9 wherein the folded portion comprises an outboard roll.

14. The system of claim 9 wherein the shielding bag has first and second projection bodies extending tangentially with respect to opposite sides of the inflator, and wherein each projection body includes at least one respective gas passage at a remote edge thereof.

15. The system of claim 14 wherein the folded portion is disposed between the first and second projection bodies.

16. The system of claim 15 wherein the folded portion comprises a Z-fold.

* * * * *